Feb. 6, 1945.   J. A. MULLER   2,368,769
SURGE VALVE
Filed April 9, 1942   2 Sheets-Sheet 1
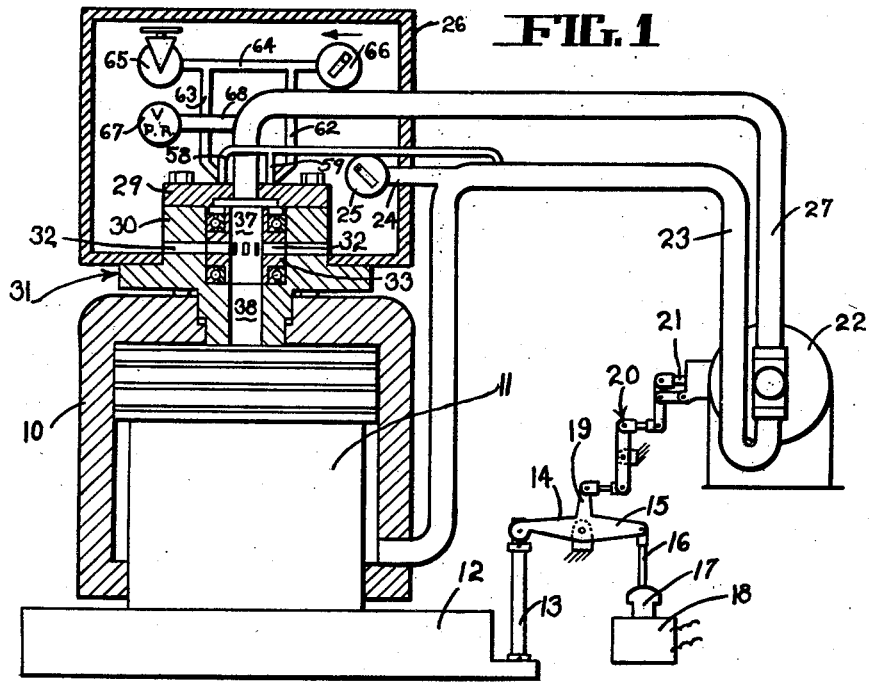
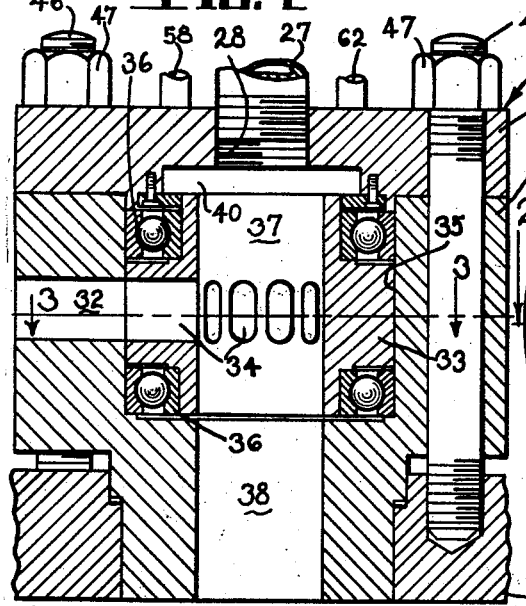
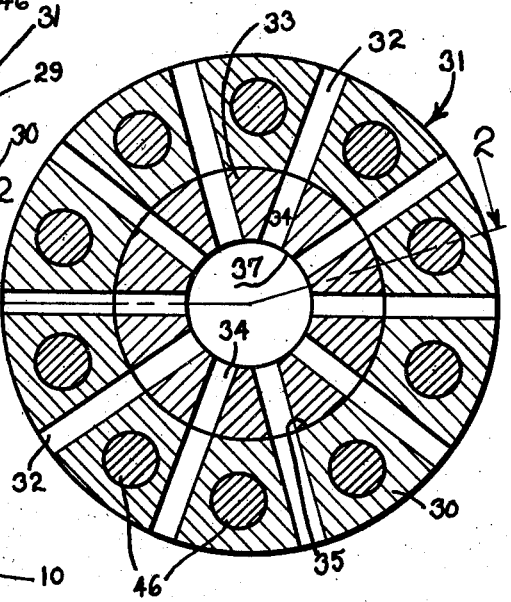
INVENTOR
JOHAN A. MULLER
BY
Toulmin & Toulmin
ATTORNEYS Feb. 6, 1945.  J. A. MULLER  2,368,769
SURGE VALVE
Filed April 9, 1942  2 Sheets-Sheet 2
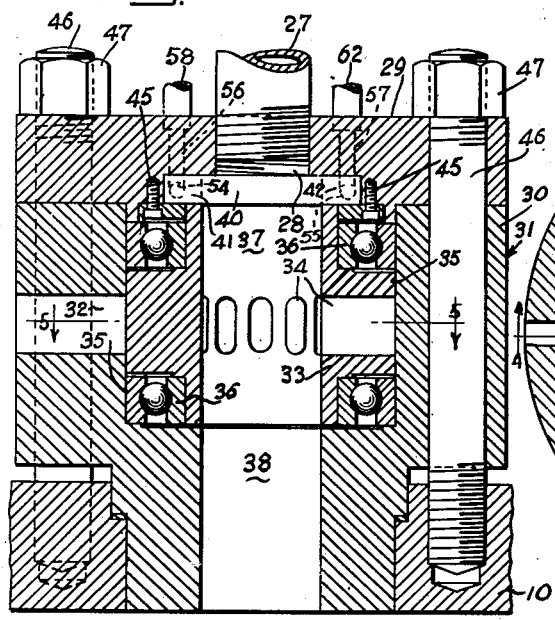
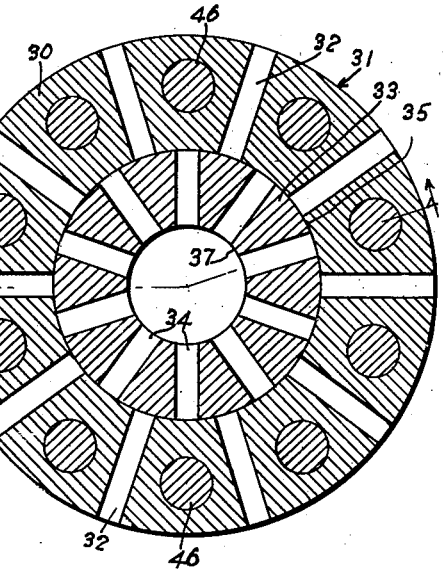
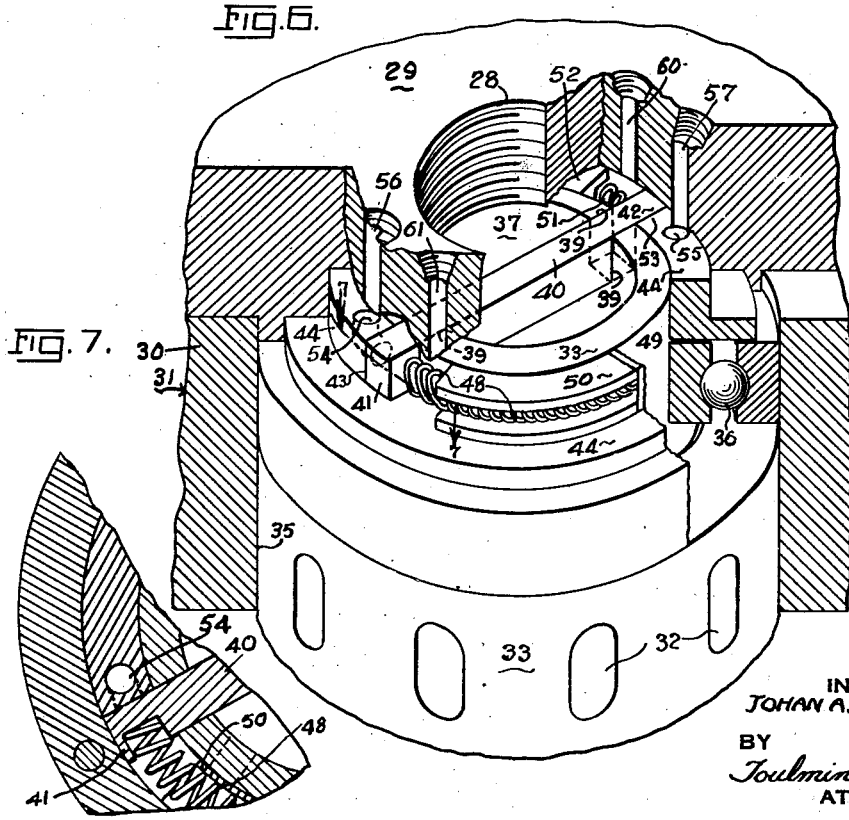
INVENTOR
JOHAN A. MULLER,
BY
Toulmin & Toulmin
ATTORNEYS Patented Feb. 6, 1945

2,368,769

UNITED STATES PATENT OFFICE 2,368,769

SURGE VALVE

Johan A. Muller, Dayton, Ohio, assignor to The Hydraulic Development Corporation, Inc., Wilmington, Del., a corporation of Delaware Application April 9, 1942, Serial No. 438,355

9 Claims. (Cl. 137—139)

This invention relates to valves and, in particular, to surge valves such as used in connection with hydraulic machinery as, for instance, hydraulic presses.

Surge valves as heretofore used in connection with hydraulic presses substantially comprise a valve body with passageways therein communicating with a fluid reservoir, while a reciprocable control member in said valve body controls the fluid connection between the said passageways and the press cylinder.

To establish the said fluid connection, the control member has to be moved toward or into the press cylinder which, however, is possible only if, prior to this movement, the fluid pressure in the press cylinder has been sufficiently reduced by exhausting a portion of the fluid from said press cylinder. To this end, it was necessary heretofore to provide a so-called cylinder relief valve which, at the initiation of a retraction stroke of the press plunger, relieves the pressure in the press cylinder by exhausting fluid therefrom.

It is, therefore, an object of this invention to provide a surge valve which will be operable in connection with hydraulic machinery, such as presses, without requiring the provision of a cylinder relief valve.

It is another object to provide a surge valve in which the control valve member is rotatable instead of being longitudinally reciprocable as in the surge valves heretofore known.

Another object of the invention consists in the provision of a surge valve in which the valve passageways are arranged substantially horizontally, thereby eliminating the customary baffle which is encountered when the heretofore known surge valves are mounted in fluid reservoirs, and which makes it necessary to provide special baffle plates.

It is a further object of the invention to provide a surge valve with a rotatable valve member for use in connection with hydraulic presses, in which the valve member will be easily rotatable even at high pressure in the press cylinder.

It is still another object to provide a surge valve with a rotatable valve member, in which the speed of movement of the rotatable valve member may be varied.

A still further object of the invention consists in the provision of a rotary surge valve which will facilitate the assembly of a fluid reservoir to be used in connection therewith and reduce the cost of making said assembly, while simultaneously reducing the length of the surge valve.

These and other objects and advantages of the invention will appear more clearly from the following specification in connection with the accompanying drawings, in which:

Figure 1 illustrates a hydraulic press system with a surge valve according to the invention.

Figure 2 is a vertical section through the surge valve of the invention taken along the line 2—2 of Figure 3.

Figure 3 is a section along the line 3—3 of Figure 2.

Figure 4 is a section similar to that of Figure 2 taken along the line 4—4 of Figure 5.

Figure 5 is a section along the line 5—5 of Figure 4.

Figure 6 is a perspective view of the upper portion of the valve according to the invention, and Figure 7 is a partial section along the line 7—7 of Figure 6.

General arrangement

The surge valve according to the invention substantially comprises a valve body with radial passageways and a longitudinal bore therethrough, having a smaller section to be connected with the press cylinder and a wider section for receiving a rotatable valve member.

The rotatable valve member is likewise provided with a longitudinal bore continuously communicating with said smaller section of the longitudinal bore in the valve body, and also communicating with radial passageways adapted to communicate with the radial passageways in the valve body when the rotary valve member occupies a predetermined position.

The longitudinal bore of the rotary valve member is adapted directly to be connected with a conduit leading to a fluid source so as to enable the fluid delivered by said fluid source to pass at all times through the longitudinal bore in the valve body into the press cylinder. This arrangement saves the porting of the press cylinder as heretofore required for establishing fluid connection between the advancing side of the press plunger and the fluid source during the entire advancing stroke of said press plunger.

Structural arrangement

Referring now to the drawings in detail, the structure shown in Figure 1 diagrammatically illustrates a press cylinder 10 having reciprocably mounted therein a press ram 11. The press ram 11 supports a press platen 12, which, in its turn, carries a push rod 13 adapted to cooperate with a three-arm lever 14. The arm 15 of the three-arm lever 14 is pivotally connected with a link 16 which, in its turn, is connected with an armature 17 controlled by a solenoid 18. The three-arm lever 14 has an arm 19 connected with a link system, generally designated 20, which, in its turn, is pivotally connected with a reciprocable control rod 21.

The shifting of the control rod 21 causes a shifting movement of the flow-control member (not shown) of the pump 22 which, in its turn, determines the delivery and the direction of delivery of the pump. The pump 22 may be of any standard design and does not form a part of the present invention. One side of the pump 22 is connected with a conduit 23 leading to the lower portion of the press cylinder 10.

Branching off from the conduit 23 is a conduit 24 comprising a check valve 25, which latter is located in a fluid reservoir or surge tank 26. The other side of the pump 22 is connected with a conduit 27 which leads to the bore 28 in the top member 29 which, in its turn, is connected, for instance by screws, to the valve casing 30 of a surge valve, generally designated 31. The valve casing 30 is provided with a plurality of radial passageways 32 adapted, in a predetermined position of the valve rotor 33, to communicate with radial passageways 34 in said valve rotor. The valve rotor 33 is in the bore 35 of the valve casing 30. To facilitate the rotation of the rotor 33, the latter is preferably journalled in anti-friction bearings 36. The anti-friction bearings 36 always maintain the periphery of the rotor slightly spaced from the adjacent wall of the valve casing, so that even if the bore in which the rotor is located is not completely parallel to the periphery of the rotor, unequal pressure acting on the periphery of the rotor will not prevent an easy rotation thereof.

The rotor 33 has a longitudinal bore 37 which is in alignment with a longitudinal bore 38 in the valve casing 30 and communicates with the latter at all times, irrespective of the position of the rotor relative to the casing. The bore 38 is in continuous communication with the upper portion of the press cylinder 10.

The valve rotor 33 is provided at the upper end thereof with two aligned notches 39 which are engaged by a vane 40 having extensions 41 and 42 beyond the periphery of the upper end of the rotor 33. One side of the extension 41 is adapted to abut a portion 43 of a control ring 44 which is connected to the top member 29 of the valve casing 30 in any convenient manner, for instance by screws 45. The valve casing 30 is rigidly connected to the press cylinder 10 by any convenient means, for instance by bolts 46 and nuts 47.

The other side of the extension 41 is engaged by one end of a spring 48, the other end of which abuts a plate 49 connected to or integral with the control ring 44. The spring 48 is preferably guided by a U-shaped spring retainer 50. Similarly, one side of the extension 42 is engaged by a spring 51 guided by a spring retainer 52, while the other side of the extension 42 is adapted to abut a portion 53 of the control ring 44. The control ring 44 is provided with two diametrically arranged passageways 54 and 55 respectively communicating with passageways 56 and 57 in the valve top member 29. The passageways 56 and 57 are connected with conduits 58 and 59 which are interconnected and lead to the conduit 23. The top member 29 is also provided with two further diametrically arranged passageways 60 and 61, which communicate with the space between the extensions 41 and 42, when the latter respectively abut the portions 43 and 53, and the adjacent face of the spring retainers 50 and 52. The passageways 60 and 61 communicate respectively with conduits 62 and 63 leading to a conduit 64, one end of which is connected to a choke valve 65, while the other end is connected to a check valve 66.

This arrangement is such that fluid from the tank 26 can enter the conduits 62 and 63 without restriction, while fluid flowing from the conduits 62 and 63 into the tank 26 must pass through the choke valve 65, which latter is adjustable so as to vary the section thereof. The surge tank 26 also houses a pressure relief valve 67 connected by a conduit 68 with the conduit 27 and adapted to operate as a safety valve, in case the pressure in the conduit 27 should become unduly high.

Operation

The operation of the surge valve according to the invention will be best understood from a description of a complete working cycle of the press shown in Figure 1 and provided with the surge valve of the invention.

It may be assumed that all parts of the structure occupy the position shown in Figures 1, 2 and 3, and that it is now desired to perform a working cycle of the press ram 11. To this end, the operator starts the driving motor (not shown) for the pump 22 and energizes the solenoid 18. Energization of the solenoid 18 causes actuation of the armature 17 which, in its turn, shifts the three-arm lever 14 in clockwise direction so that the latter by means of the link system 20 shifts the control rod 21 toward the right, thereby placing the pump 22 in full delivery forward stroke position.

Pressure fluid now passes from the pump 22 through conduit 27 into the bore 28 and from there through the bores 37 and 38 into the upper portion of the press cylinder 10. Simultaneously, fluid is withdrawn from the lower portion of the press cylinder 10 through the conduit 23 to the pump 22. The ram 11 now moves downwardly by gravity as fast as fluid is withdrawn through the conduit 23. Since, as was assumed, the valve rotor 33 occupies the position shown in Figures 2 and 3, in which the passageways 34 and 32 are in alignment with each other, the fluid delivered by the pump 22 through the condit 27 is supplemented by fluid from the tank 26 passing through the passageways 32 and 34 into the bore 37 and from there through the bore 38 into the upper portion of the press cylinder 10.

The weight of the ram 11 during this downward movement is sufficient to maintain the fluid in the conduit 23 under pressure which is conveyed through conduits 58 and 59, passageways 56 and 57 and passageways 54 and 55 to the extensions 41 and 42. This pressure is sufficiently high to counteract the thrust of the springs 48 and 51 so that the valve rotor 33 remains in the position shown in Figures 2 and 3.

As soon as the press platen 12 engages the work piece, the work piece takes up the weight of the ram 11 and the pressure in the conduit 23 drops to such an extent that the springs 48 and 51, acting on the extensions 41 and 42 of the vane 40, move the latter in clockwise direction with regard to Figures 6 and 7, thereby interrupting fluid communication between the passageways 32 and 34. Consequently, also fluid communication between the tank 26 and the bore 38 is interrupted. The space created by the clockwise movement of the vane 40 between the extensions 41 and 42 and the adjacent ends of the spring retainers 50 and 52 is filled with fluid from the tank 26, which fluid passes through the check valve 66 and the conduits 64, 62 and 63, and furthermore through the passageways 60 and 61. The press ram 11 now starts its actual pressing stroke.

At the completion of this pressing stroke, the solenoid 18 is deenergized in any standard manner well known to those skilled in the art, whereupon a spring (not shown) in the pump 22 shifts the control rod 21 toward the left, thereby placing the pump 22 on full delivery retraction stroke. Consequently, fluid pressure is now delivered by the pump 22 into the conduit 23 from where it is conveyed through conduits 58 and 59 through the passageways 56 and 57 into the passageways 54 and 55. Here the pressure fluid acts on the extensions 41 and 42 of the vane 40 so as to shift the latter in anticlockwise direction with regard to Figures 6 and 7. The fluid expelled during this anticlockwise movement from the space between the extensions 41 and 42 and the adjacent ends of the spring retainers 50 and 52 passes through the conduits 62, 63 and 64 and the choke valve 65 into the tank 26. The adjustment of the choke valve 65 will determine the speed of the said anticlockwise movement of the vane 40. The anticlockwise movement is completed when the extensions 41 and 42 abut the adjacent ends of the spring retainers 50 and 52. Since the vane 40, as mentioned above, is connected with the rotor 33, the anticlockwise movement of the vane 40 also causes the rotor 33 to move in anticlockwise direction. When the vane 40 and the rotor 33, on this anticlockwise movement, approach their end positions, the passageways 34 again come into alignment with the passageways 32 so as to occupy the position shown in Figures 2 and 3.

Since now fluid connection is again established between the bores 38 and 37 and the tank 26 through the passageways 34 and 32, the pressure in the conduit 23, which is also conveyed to the lower portion of the press cylinder 10, causes the ram 11 to start its retraction stroke. The fluid expelled by the ram 11 from the upper portion of the press cylinder 10 escapes through the surge valve 31 into the tank 26.

When the ram 11 approaches the end of its retraction stroke, the push rod 13, connected to the platen 12, comes into engagement with the three-arm lever 14 and shifts the latter so as to cause the link system 20 to move the control rod 21 into an intermediate or neutral position, thereby shifting the pump to neutral or no delivery position. Since now no fluid is delivered to or withdrawn from the press cylinder 10, the press ram 11 comes to a halt and the press is ready for a new cycle.

As will be clear from the above description of the operation of the press shown in Figure 1, the movement of the surge valve 31 into open position at the initiation of the retraction stroke of the ram 11 is in no way impeded or prevented by the pressure in the upper portion of the press cylinder 10 since, in contrast to the heretofore known surge valves, no member has to be moved into the pressure fluid in the upper part of the press cylinder 10.

Consequently, the new surge valve, according to the invention, does away with the relief valve heretofore required for relieving the pressure in the upper end of the press cylinder before the member can be moved into the fluid in the upper portion of the press cylinder. Since the said relief valve has become superfluous by the new surge valve, not only the cost of the said relief valve is saved, but the initiation of the retraction stroke is also speeded up so that the output of the press is increased. In this way, the provision of the new surge valve yields a material reduction in the cost of production of the press and an increase in the output of the press.

Although the rotor 33 may be shifted without the provision of the anti-friction bearings 36, the provision of such anti-friction bearings materially facilitates the shifting movement of the rotor.

As will be clear from the drawings, no direct connection between the conduit 27 and the upper end of the press cylinder 10 is necessary, since the conduit 27 can, at all times during the cycle, communicate with the upper portion of the press cylinder through the bores 37 and 38 of the surge valve 31. This saves the cost of additionally porting the upper end of the press cylinder 10, as was necessary when using the surge valves heretofore known.

It will also be noted that the total length of the surge valve according to the invention is materially reduced with regard to the total length of the surge valves heretofore known.

Another advantage of the surge valve according to the present invention consists in that the passageways 34 and 32 are arranged substantially horizontally, so that the fluid expelled from the press cylinder during the retraction stroke of the press ram is exhausted to the bottom of the tank, thereby preventing the splashing encountered when using the surge valves heretofore known.

It will also be noted from the drawings that sufficient space is provided between the valve passageways and the top of the cylinder 10 to permit a flange to be cast on the valve body upon which may be mounted the surge tank 26. This makes it unnecessary to machine the heavier cylinder casting for receiving the bottom of the tank 26.

It is, of course, understood that the valve according to the invention is by no means limited to the specific structure shown in the drawings, but that various modifications of the structure may be made without changing the principle of the invention, for instance, if desired, the springs 48 and 51 in the spring retainers 50 and 52 may be replaced by hydraulic plungers, in which instance these plungers could be operated by pressure from a pilot system actuating the reversible variable delivery pump 22.

It will be understood that I desire to comprehend within my invention such modifications as come within the scope of the claims.

Having thus fully described my invention, what I claim as new and desire to secure by Letters Patent, is:

1. A surge valve comprising a casing having a bore therethrough and a valve opening intersecting said bore, a hollow rotor rotatably mounted within said bore and having a passageway therethrough passing from one end to the other end thereof and being open at its ends, said passageway being adapted in a predetermined position of said rotor hydraulically to communicate with said opening, means connected to one end of said rotor and arranged around said passageway and operable by pressure fluid for moving said rotor into said predetermined position, a plurality of ports in said casing for passing fluid to and from said last mentioned means and yielding means also around said passageway continuously urging said rotor into a position in which said passageway does not communicate with said opening.

2. A surge valve comprising a casing with a substantially horizontal passageway therethrough, said valve casing also being provided with a substantially vertical bore passing completely therethrough, a rotor rotatable in said vertical bore and provided with a substantially horizontal passageway adapted to be moved into alignment with the passageway in said casing, said rotor also being provided with a substantially vertical bore open at its ends and continuously communicating with the vertical bore in said casing so as to form a continuous channel through said valve, fluid operable means associated with said rotor and arranged within said casing and around said vertical bores for moving said passageways into alignment with each other, thereby establishing fluid connection between said passageways and said vertical bores, and means also arranged within said casing and around said vertical bores and operable selectively for moving said passageways out of alignment with each other.

3. A surge valve comprising a casing having a bore completely therethrough, and also being provided with a port intersecting said bore, a rotor having a longitudinal bore therethrough arranged in axial alignment with said bore in said casing and also in continuous fluid communication therewith, said rotor also being provided with a passageway arranged at an angle to and intersecting said longitudinal bore in said rotor and adapted to establish fluid connection between said port and said longitudinal bore in a first position of said rotor, yielding means arranged within said casing around said bore and continuously urging said rotor into a second position for preventing fluid connection between said port and said longitudinal bore, and fluid operable means arranged within said casing and around said longitudinal bore and operable to engage and to move said rotor into said first position against the thrust of said yielding means.

4. A surge valve comprising a casing having a longitudinal bore passing therethrough, said casing also being provided with a passageway therethrough transverse to said longitudinal bore and connecting with the outside of said casing, a rotor rotatable within said casing and provided with a longitudinal bore therethrough open at its ends and arranged in axial alignment with the longitudinal bore in said casing and also being provided with a transverse bore continuously communicating with the longitudinal bore in said rotor and adapted to communicate with said passageway in a predetermined position of said rotor, means within said casing arranged around said longitudinal bores and associated with said rotor for moving the latter into said predetermined position, and means associated with said last mentioned means for moving said rotor out of said predetermined position.

5. A surge valve comprising a casing having a longitudinal bore passing completely therethrough with a larger section and a smaller section, said casing also being provided with a passageway therethrough transverse to said longitudinal bore, a rotor rotatably mounted within said larger section and having a longitudinal bore therethrough open at its ends and in continuous fluid communication with the longitudinal bore in said casing, anti-friction bearings between the wall portion of said larger section and the adjacent wall portion of said rotor for rotatably supporting the latter, said rotor also being provided with a transverse bore therethrough in continuous fluid communication with the longitudinal bore in said rotor and adapted to communicate with said passageway in said casing in a predetermined position of said rotor, means arranged within said casing and around said longitudinal bores and associated with said rotor for moving the latter into said predetermined position, and yielding means also arranged within said casing and around said longitudinal bores for continuously urging said rotor out of said predetermined position.

6. A surge valve comprising a hollow casing having ports in either end thereof and a passageway in the wall thereof transverse to the axis of said casing, a rotor rotatable in said hollow casing and provided with a longitudinal bore therethrough arranged in alignment with the ports in the ends of said casing so as to provide a substantially unrestricted axial passage through said valve from end to end, said rotor also being provided with a transverse bore adapted to communicate with said passageway in a predetermined position of said rotor, means associated with said rotor and arranged around said longitudinal bore for moving said rotor into said predetermined position, and means associated with said last mentioned means for moving said rotor out of said predetermined position, and means for hydraulically controlling said last mentioned movement.

7. A surge valve comprising in combination a casing having an axial bore therethrough and a port in said bore, and a plurality of control ports, a rotor rotatably mounted in said casing and having a first passageway therethrough in continuous fluid communication with said bore, said rotor also being provided with a second passageway continuously communicating with said first passage and operable selectively to be moved into fluid communication with said port, and a fluid operable member movably mounted in said casing and arranged around said first passageway and in continuous fluid communication with said control ports, said member being operable to bring about movement of said rotor so as selectively to effect or interrupt fluid communication between said second passageway and said port in said bore.

8. A surge valve comprising a substantially cylindrical hollow casing having a port in either end thereof and a passageway in the wall thereof transverse to the axis of said casing, a rotor rotatable in said hollow casing and provided with a longitudinal bore therethrough arranged in alignment with the said ports in the ends of said casing so as to provide a substantially unrestricted axial passage through said valve from end to end, said rotor also being provided with a transverse bore adapted to communicate with said passageway in a predetermined position of said rotor, a plurality of fluid operable means associated with said rotor and arranged around said longitudinal bore at equally spaced intervals and operable to move said rotor into said predetermined position, and yielding means associated with said fluid operable means for continuously urging said rotor out of said predetermined position.

9. A surge valve comprising a substantially cylindrical hollow casing having a port in either end thereof and a passageway in the wall thereof transverse to the axis of said casing, a rotor rotatable in said hollow casing and provided with a longitudinal bore therethrough arranged in alignment with the said ports in the ends of said casing so as to provide a substantially unrestricted axial passage through said valve from end to end, said rotor also being provided with a transverse bore adapted to communicate with said passageway in a predetermined position of said rotor, a plurality of fluid operable means associated with said rotor and arranged around said longitudinal bore at equally spaced intervals and operable to move said rotor into said predetermined position, yielding means associated with said fluid operable means for continuously urging said rotor out of said predetermined position, and means for hydraulically regulating the rate of movement of said rotor into said predetermined position when actuated by said fluid operable means.

JOHAN A. MULLER.